(12) United States Patent
Schmidt et al.

(10) Patent No.: US 6,715,868 B2
(45) Date of Patent: Apr. 6, 2004

(54) DIRECT DYE INKS AND A METHOD OF MAKING DIRECT DYE INKS

(75) Inventors: Peter D. Schmidt, Chanhassen, MN (US); Uyen Q. Thai, Brooklyn Park, MN (US)

(73) Assignee: MacDormid Colorspan, Inc., Eden Prairie, MN (US)

( * ) Notice: Subject to any disclaimer, the term of this patent is extended or adjusted under 35 U.S.C. 154(b) by 148 days.

(21) Appl. No.: 10/057,569

(22) Filed: Jan. 25, 2002

(65) Prior Publication Data

US 2002/0155224 A1 Oct. 24, 2002

Related U.S. Application Data

(60) Provisional application No. 60/269,364, filed on Feb. 16, 2001.

(51) Int. Cl.$^7$ ............................................... G01D 11/00
(52) U.S. Cl. ....................................................... 347/100
(58) Field of Search ........................... 347/95, 100, 102, 347/101; 106/31.58, 31.49, 31.27, 31.13; 427/337

(56) References Cited

U.S. PATENT DOCUMENTS

| | | |
|---|---|---|
| 3,903,034 A | 9/1975 | Zabiak et al. |
| 3,929,697 A * | 12/1975 | Morrill et al. ............... 106/214 |
| 4,170,482 A | 10/1979 | Mansukhani |
| 4,196,006 A | 4/1980 | Mansukhani |
| 4,243,994 A | 1/1981 | Kobayashi et al. |
| 4,290,072 A | 9/1981 | Mansukhani |
| 4,471,079 A | 9/1984 | Enami |
| 4,545,818 A | 10/1985 | Inoue et al. |
| 4,585,815 A | 4/1986 | Ono et al. |
| 4,683,002 A | 7/1987 | Mirua et al. |
| 4,689,078 A | 8/1987 | Koike et al. |
| 4,785,313 A | 11/1988 | Higuma et al. |
| 4,789,399 A | 12/1988 | Williams et al. |
| 4,910,084 A | 3/1990 | Yamasaki et al. |
| 4,914,562 A | 4/1990 | Abe et al. |
| 4,959,661 A | 9/1990 | Buxton et al. |
| 4,965,609 A | 10/1990 | Tomida et al. |
| 4,978,969 A | 12/1990 | Chieng |
| 4,990,186 A | 2/1991 | Jones et al. |
| 5,006,172 A | 4/1991 | Chieng et al. |
| 5,026,427 A | 6/1991 | Mitchell et al. |
| 5,053,079 A | 10/1991 | Haxell et al. |
| 5,066,332 A | 11/1991 | Brown et al. |
| 5,098,478 A | 3/1992 | Krishnan et al. |
| 5,100,468 A | 3/1992 | Yuasa et al. |
| 5,100,471 A | 3/1992 | Winnik et al. |
| 5,100,969 A | 3/1992 | Yamamoto et al. |
| 5,106,417 A | 4/1992 | Hauser et al. |
| 5,114,477 A | 5/1992 | Mort et al. |
| 5,122,814 A | 6/1992 | Endo et al. |
| 5,143,546 A | 9/1992 | Yuasa et al. |
| 5,156,675 A | 10/1992 | Breton et al. |
| 5,165,968 A | 11/1992 | Johnson et al. |
| 5,167,703 A | 12/1992 | Eida et al. |
| 5,172,133 A | 12/1992 | Suga et al. |
| 5,173,111 A | 12/1992 | Krishnan et al. |
| 5,180,425 A | 1/1993 | Matrick et al. |
| 5,184,148 A | 2/1993 | Suga et al. |
| 5,187,229 A | 2/1993 | Yamamoto et al. |
| 5,190,581 A | 3/1993 | Fukushima et al. |
| 5,194,475 A | 3/1993 | Kruse et al. |
| 5,203,913 A | 4/1993 | Yamamoto et al. |
| 5,211,747 A | 5/1993 | Breton et al. |
| 5,221,332 A | 6/1993 | Kohlmeier |
| 5,223,026 A | 6/1993 | Schwarz, Jr. |
| 5,226,957 A | 7/1993 | Wickramanayake et al. |
| 5,229,786 A | 7/1993 | Suga et al. |
| 5,242,489 A | 9/1993 | Schwarz, Jr. |
| 5,281,261 A | 1/1994 | Lin |
| 5,286,286 A | 2/1994 | Winnik et al. |
| 5,296,022 A | 3/1994 | Kobayashi et al. |
| 5,316,575 A | 5/1994 | Lent et al. |
| 5,324,349 A | 6/1994 | Sano et al. |
| 5,328,504 A | 7/1994 | Ohnishi |
| 5,342,440 A | 8/1994 | Wickramanayake |
| 5,345,254 A | 9/1994 | Wong et al. |
| 5,370,731 A | 12/1994 | Yamashita et al. |
| 5,376,169 A | 12/1994 | Hotomi et al. |
| 5,378,574 A | 1/1995 | Winnik et al. |
| 5,380,358 A | 1/1995 | Aoki et al. |
| 5,389,132 A | 2/1995 | Davulcu et al. |
| 5,395,431 A | 3/1995 | Siddiqui et al. |
| 5,415,686 A | 5/1995 | Kurabayashi et al. |
| 5,417,747 A | 5/1995 | Arata et al. |
| 5,429,841 A | 7/1995 | Batlaw et al. |
| 5,439,517 A | 8/1995 | Yoshida et al. |
| 5,441,561 A | 8/1995 | Chujo et al. |
| 5,443,628 A | 8/1995 | Loria et al. |

(List continued on next page.)

FOREIGN PATENT DOCUMENTS

| | | | |
|---|---|---|---|
| EP | 0826752 A2 | 3/1998 | |
| EP | 0869160 A2 | 10/1998 | |
| JP | 401085343 A * | 3/1989 | ............. 427/207.1 |
| WO | WO98/06789 | 2/1998 | |

OTHER PUBLICATIONS

US 5,123,959, 6/1992, Fukushima et al. (withdrawn)

*Primary Examiner*—Stephen D. Meier
*Assistant Examiner*—An H. Do
(74) *Attorney, Agent, or Firm*—Carmody & Torrance LLP

(57) ABSTRACT

A dye-based, thermal ink jet printer ink is formulated by combining a water miscible organic solvent, water, and a dye, and blending the water miscible organic solvent, the water, and the dye together. The ink has the ability to form printed images on a variety of textile media and can be used to achieve acceptable results on both coated silk and coated cotton substrates. Also included is a method of making the ink jet ink and a method of applying the ink to a recording medium.

32 Claims, No Drawings

U.S. PATENT DOCUMENTS

| | | | |
|---|---|---|---|
| 5,462,590 A | | 10/1995 | Yui et al. |
| 5,465,107 A | * | 11/1995 | Mayo et al. .................. 347/37 |
| 5,466,287 A | | 11/1995 | Lyon |
| 5,478,382 A | | 12/1995 | Miller et al. |
| 5,484,475 A | | 1/1996 | Breton et al. |
| 5,498,282 A | | 3/1996 | Miller et al. |
| 5,500,040 A | | 3/1996 | Fujinami |
| 5,503,664 A | | 4/1996 | Sano et al. |
| 5,510,397 A | | 4/1996 | Okuda et al. |
| 5,512,089 A | | 4/1996 | Thakkar |
| 5,514,207 A | | 5/1996 | Fague |
| 5,529,617 A | | 6/1996 | Yamashita et al. |
| 5,531,818 A | | 7/1996 | Lin et al. |
| 5,549,740 A | | 8/1996 | Takahashi et al. |
| 5,575,843 A | | 11/1996 | Krishnan et al. |
| 5,596,027 A | | 1/1997 | Mead et al. |
| 5,604,276 A | | 2/1997 | Suga |
| 5,606,356 A | | 2/1997 | Noguchi et al. |
| 5,658,376 A | | 8/1997 | Noguchi et al. |
| 5,667,569 A | | 9/1997 | Fujioka |
| 5,667,572 A | | 9/1997 | Taniguchi et al. |
| 5,690,721 A | | 11/1997 | Itoh |
| 5,700,851 A | | 12/1997 | Banning et al. |
| 5,707,432 A | | 1/1998 | Adams et al. |
| 5,709,737 A | | 1/1998 | Malhotra et al. |
| 5,746,817 A | | 5/1998 | Katsen et al. |
| 5,746,818 A | | 5/1998 | Yatake |
| 5,760,257 A | | 6/1998 | Tanaka et al. |
| 5,803,958 A | | 9/1998 | Katsen et al. |
| 5,837,754 A | | 11/1998 | Shimomura et al. |
| 5,847,028 A | | 12/1998 | Iwase et al. |
| 5,851,273 A | | 12/1998 | Morris et al. |
| 5,854,307 A | | 12/1998 | Kimura et al. |
| 5,876,491 A | | 3/1999 | Gunn et al. |
| 5,876,492 A | | 3/1999 | Malhotra et al. |
| 5,882,389 A | | 3/1999 | Schwarz, Jr. |
| 5,946,012 A | | 8/1999 | Courian et al. |
| 5,948,155 A | | 9/1999 | Yui et al. |
| 5,954,866 A | | 9/1999 | Ohta et al. |
| 5,969,003 A | * | 10/1999 | Foucher et al. ............ 106/31.6 |
| 6,033,463 A | | 3/2000 | Yui et al. |
| 6,077,339 A | | 6/2000 | Nyssen et al. |
| 6,113,680 A | | 9/2000 | Aoyama et al. |
| 6,153,001 A | | 11/2000 | Suzuki et al. |
| 6,261,353 B1 | | 7/2001 | Doi et al. |
| 6,284,029 B1 | | 9/2001 | Sano et al. |

* cited by examiner

DIRECT DYE INKS AND A METHOD OF MAKING DIRECT DYE INKS

This application claims the benefit of U.S. Provisional Application No. 60/269,364, filed Feb. 16, 2001.

BACKGROUND OF THE INVENTION

Thermal ink jet print is a commonly used method of recording images on recording material, such as paper or cloth, by discharging discrete droplets of ink from nozzles of a print head and allowing these droplets to be absorbed by the recording material. Thermal ink jet recording offers opportunities for quiet, high speed, full color printing. Also, images printed with thermal ink jet printers seldom need to be fixed or treated after the ink droplets are absorbed on the recording material.

Thermal ink-jet printing is a non-impact printing process in which ink droplets are formed and thereafter deposited on a print medium in a particular order to form an image on the print medium. The low cost and high quality of the printed output in combination with the relatively noise-free operation of ink jet printers have made ink jet printing a popular and economical alternative to other types of printing in consumer, office, and industrial settings.

Thermal ink-jet printing is one example of a drop-on-demand form of non-impact printing. Other examples of drop-on-demand systems, besides thermal ink jet, are piezoelectric ink jet, acoustic ink jet, and vibrating ink jet systems. Besides drop-on-demand systems, there are also continuous stream ink jet printing systems. In continuous stream ink jet systems, ink is emitted in a continuous stream under pressure through at least one orifice or nozzle. The stream of ink is then broken up into droplets at a fixed distance from the orifice, and the ink droplets are thereafter directed toward the recording medium or recycled into the printing ink supply.

In drop-on-demand systems, an ink droplet is not formed or expelled from the print head unless the droplet is to be placed on the recording medium. Therefore, since drop-on-demand systems require no ink recovery or post-ejection treatment, drop-on-demand systems are typically somewhat simpler in construction and operation than continuous stream ink jet printing systems. Thermal ink jet (sometimes referred to as "bubble jet") systems are one of the most common types of drop-on-demand ink jet printing systems.

In thermal ink jet printing, the energy for drop formation and ejection is generated by electrically heated resistor elements. The resistor elements heat up rapidly in response to electrical signals from a microprocessor to create a vapor bubble. Superheating of the ink far above the normal boiling point of the ink causes the bubble formation. The expansion of the bubble forces a droplet of ink out of a nozzle at a high rate of speed toward the recording medium. After the collapse of the bubble, the ink channel proximate the resistor elements refills by capillary action.

Colorants for inks printed by thermal ink jet printing may be generally classified as dyes or pigments. Accordingly, thermal ink jet printer inks may incorporate dye(s), pigment (s), or a combination of dye(s) and pigment(s) to print images on the recording media. Of these three, dye-based thermal ink jet printer ink compositions are most widely available commercially.

Dye-based thermal ink jet inks currently in use in the industry demonstrate an inability to achieve acceptable results on both coated silk and coated cotton substrates. The present invention relates to a thermal ink jet printer ink that may incorporate a direct dye. The present invention further relates to a dye-based, thermal ink jet printer ink with the ability to form printed images on a variety of textile medias.

BRIEF SUMMARY OF THE INVENTION

The present invention includes a method of making a ink jet ink. The method entails combining a water miscible organic solvent, water, and a dye, and blending the water miscible organic solvent, the water, and the dye together to form the ink jet ink. The ink jet ink produced by this method is capable of forming a printed image on a variety of coated textiles and cloths. The present invention further includes a method of forming a printed image on a recording medium and a thermal ink jet ink.

DETAILED DESCRIPTION OF THE PREFERRED EMBODIMENTS

The present invention generally concerns a technique for preparing dye-based ink jet inks for use in thermal ink jet printers. The ink of the present invention is beneficially applicable to a variety of coated textiles. More specifically, a particular ink of the present invention can be applied to both coated silk and coated cotton textiles with acceptable results, despite differences between the substrates. This is an advance over the inability of prior dye-based thermal ink jet inks to achieve acceptable results on both coated silk and coated cotton textile substrates. This beneficial property of the inventive ink is believed to be due, in substantial part, to the use of direct dyes as opposed to anionic, cationic, reactive or dispersive dyes. The applicability of the inventive ink to both coated silk and coated cotton textile substrates the ink is attributable to the formulation and dye selection for the inventive ink. The inventive ink is achieved using relatively inexpensive components that are combined using simple equipment via a very simple mixing procedure.

The ink of the present invention includes, at a minimum, water, a water miscible organic solvent, and dye. The dye may be provided as part of a dye solution. The dye solution that may be incorporated as part of the ink of the present invention includes both a dye and a liquid carrier for the dye, typically water. The dye is usually obtained from a commercial source in prepared form. Some examples of suitable, commercially available, dyes include Direct Yellow 132 Dye that is available from Tricon Colors LLC of Elmwood Park, N.J.; Intrajet Liquid Magenta DJL that is available from Crompton & Knowles Colors Incorporated of Charlotte, N.C.; and Duasyn Direct Turquoise Blue FRL-SF Liquid and Duasyn Direct Black HEF-SF Liquid that is available from Clariant Corporation of Coventry, Rhode Island.

The dyes that are included in the inks of the present invention preferably have a nominal particle size of about 0.1 microns or less, and are salt free to enhance the excellent transparency of the inventive inks. To ensure that the dyes, and other components, have not contained any large particulate contamination, it is recommended that the ink be filtered through a 0.45 micron polytetrafluroethylene (PTFE) filter prior to placing the ink in the printing device, such as a thermal ink jet printer.

Some non-exhaustive examples of the water miscible organic solvent of the ink of the present invention include ethers, such as tetrahydrofuran, dioxane, glycol ether, etc.; oxyethylene or oxypropylene addition dimers, trimers, or polymers, such as diethylene glycol, triethylene glycol, tetraethylene glycol, dipropylene glycol, tripropylene glycol, polyethylene glycol, polypropylene glycol, etc.; alkylene glycols having an alkylene group of 2 to 6 carbons, such as ethylene glycol, propylene glycol, trimethylene glycol, butylene glycol, 1,2,6-hexanetriol, hexylene glycol, etc.; thiodiglycol; glycerin; lower alkyl ethers of a polyhydric alcohol, such as ethylene glycol monomethyl (or monoethyl) ether, diethylene glycol monomethyl (or monoethyl) ether, triethylene glycol monomethyl (or monoethyl) ether, propylene glycol monomethyl (or monoethyl) ether, dipropylene glycol monomethyl (or monoethyl) ether, tripropylene glycol monomethyl (or monoethyl) ether, etc.; lower dialkyl ethers of a polyhydric alcohol, such as triethylene glycol dimethyl (or diethyl) ether, tetraethylene glycol dimethyl (or diethyl) ether, etc.; sulfolane; 1,3-dimethyl-2-imidazolidinone; and any of these in any combination.

The concentration of the water miscible organic solvent in the ink of the present invention may generally range from about 2% to about 30%, by weight, based on the total weight of the ink. The concentration of the water miscible organic solvent in the ink more preferably ranges from about 5% to about 20% by weight, based on the total weight of the ink. The concentration of the water miscible organic solvent in the ink most preferably ranges from about 10% to about 15%, by weight, based on the total weight of the ink.

Any of the water miscible organic solvents listed above may be used individually or may be used in combination as the water miscible organic solvent component of the ink. When used in combination, the various examples of the water miscible organic solvent that are listed above may be used together in any combination. However, the water miscible organic solvent of the ink preferably includes a high-boiling, water miscible organic solvent that is selected from oxyethylene or oxypropylene addition dimers, trimers, or polymers, lower alkyl ethers of a polyhydric alcohol, and any of these in any combination.

A "high-boiling," water miscible organic solvent is a water miscible organic solvent with a boiling point, at 1 atmosphere of gauge pressure, that is greater than the boiling point of water (>212° F.). The water and the high-boiling water miscible organic solvent forms a eutectic mixture. The high-boiling water miscible solvent is believed to control the rate of evaporation of water from the ink. By controlling the water evaporation rate, the high-boiling water miscible solvent is consequently thought to help maintain uniform dispersion of the dye in the ink, even during and after formation of ink droplets.

Distilled or deionized water is commonly used. The water that is used in combination with the water miscible organic solvent and the dye may be present in the ink of the present invention at a concentration ranging from about 5% to about 95% by weight, based on the total weight of the ink. More preferably, the water is present in the ink of the present invention at a concentration ranging from about 35% to about 90% by weight, based on the total weight of the ink. Most preferably, the concentration of the water in the ink ranges from about 70% to about 90% by weight, based on the total weight of the ink.

The dye that is combined with the water miscible organic solvent and the water to form the ink of the present invention, depending upon the particular dye selected for the ink, may generally be present in the ink from about 0.1% to about 55% by weight, based on the total weight of the ink. For example, yellow ink may be made to contain from about 0.1 to about 30 weight percent of the yellow dye when the yellow dye is the Direct Yellow 132 Dye, magenta ink may be made to include from about 0.1 to about 45 weight percent of the magenta dye when the magenta dye is the Intrajet Liquid Magenta DJL, cyan ink may be made to include from about 0.1 to about 45 weight percent of the dye when the cyan dye is the Duasyn Direct Turquoise Blue FRL-SF Liquid, and the black ink may be made to include from about 0.1 to about 55 weight percent of the black dye when the black dye is the Duasyn Direct Black HEF-SF Liquid.

The components of the ink are selected so that these components do not cause or support precipitation or separation of the dye. Dipropylene glycol is the preferred high-boiling water miscible organic solvent for use in the ink because dipropylene glycol has been found to serve as a humectant that tends to help prevent clogging and plugging of jetting nozzles in ink jet printers. Lower alkyl ethers of a polyhydric alcohol, such as dipropylene glycol monomethyl ether, are preferred examples of the high-boiling water miscible organic solvent since lower alkyl ethers of a polyhydric alcohol, such as dipropylene glycol monomethyl ether, are thought to enhance adhesion of the ink to textile substrates on which the ink is applied. Also, lower alkyl ethers of a polyhydric alcohol are thought to help maintain uniform dispersions of the dye in the ink, even after formation of the ink droplets and application of the ink droplets to the recording medium.

Though surfactants may be incorporated into the ink of the present invention, surfactants are preferably excluded from the ink. The role of any surfactant included in the ink is to reduce the surface tension of the liquid components of the ink to help enhance dispersion of the dye in the ink. For many dyes, such use of surfactant is not believed necessary to maintain dispersion of the dye in the ink. Nonetheless, it is permissible to include surfactant in the ink at a concentration ranging from about 0.1 weight percent to about 1.0 weight percent, based upon the total weight of the ink. Some commercially available dyes are believed to contain surfactant. Also, some examples of water-miscible surfactants that may permissibly be included in the ink are (1) surfactants from the SURFYNOL® line of surfactants that are available from Air Products and Chemicals, Inc. of Allentown, Pa. and (2) surfactants from the TERGITOL® line of surfactants and from the TRITON® line of surfactants that are each available from Union Carbide, Inc. of Danbury, Conn. Some non-exhaustive examples of suitable SURFYNOL® surfactants include the SURFYNOL® 440, 502, and 504 surfactants. Some non-exhaustive examples of suitable TERGITOL® surfactants include the TERGITOL® 15-5-7 and 15-5-9 surfactants. Some non-exhaustive examples of suitable TRITON® surfactants include the TRITON® CF-10, CF-21, and XL-80N surfactants.

Besides the water miscible organic solvent, water, and dye, the ink of the present invention may additionally include a biocide to enhance the long-term stability of the ink versus any detrimental biological organisms that may be present. An example of a suitable, commercially available biocide is Proxel GXL available from Zeneca Incorporated of Wilmington, Del. Most preferably, the concentration of the biocide in the ink ranges from about 0.05% to about 0.2% by weight, based on the total weight of the ink.

The ink of the present invention that is described above is particularly suited for use in a thermal ink jet printer, such as a bubble jet printer. However, if it is desired, the ink of the present invention may be modified to permit use of the inventive ink in other types of ink jet printers, such as a piezo ink jet printer. This modification for piezo ink jet printing entails the addition of a quick drying water soluble polymer, such as an acrylic polymer. However, for use in thermal ink jet printing, water-soluble polymer, such as the acrylic polymer, is preferably not included in the ink of the present invention, since such water-soluble polymer will detract from the otherwise beneficial properties of the inventive ink in relation to thermal ink jet printing.

Beneficially, the inks of the present invention are capable of being used in high-speed thermal ink jet printing to produce, after drying of the printed ink, circular-shaped dots that are substantially free, and preferably are entirely free, of ragged edges. When the inks of the present invention are used together in an ink set of a thermal ink jet printer, with the different inks of the ink set containing different dyes and/or different concentrations of dye, each of the ink sets are capable of being used in high-speed thermal ink jet printing to produce circular-shaped dots that have about the same diameter as dots produced with other inks of the particular ink set.

To support high-speed jetting of the ink out of the thermal ink jet printer ink chamber, the ink produced in accordance with the present invention preferably should have a low Brookfield viscosity ranging from about 1.0 centipoise to about 4.0 centipoise at an ink temperature of about 25° C. More preferably, the ink should have a Brookfield viscosity ranging from about 1.0 centipoise to about 3.0 centipoise at an ink temperature of about 25° C. Still more preferably, the ink of the present invention should preferably have a Brookfield viscosity ranging from about 1.5 centipoise to about 2.5 centipoise at an ink temperature of about 25° C. The ink viscosity is determined using a Brookfield Model DV-III programmable rheometer equipped with an adaptor for small samples. The Brookfield Model DV-III rheometer is available from Brookfield Engineering Laboratories, Inc. of Stoughton, Mass.

The viscosity (the "Brookfield viscosity") of a particular ink sample is determined with the ink sample at room temperature (about 25° C.). About 5 grams of the particular ink being tested are placed in the small sample adaptor which is positioned within the viscosity measurement cell of the rheometer. An appropriate spindle, identified by a spindle number and selected so that the measured viscosity is within the range of the particular spindle, is positioned within the small sample adaptor within the measurement cell. The Brookfield viscosity is measured while running the selected spindle at a revolution per minute (RPM) rate selected based upon calibration studies conducted at the direction of the inventor. For all viscosity determinations and specifications of this disclosure, Spindle No. 18 is selected and is rotated at about 225 RPM during viscosity determinations, unless otherwise indicated.

Also, each ink produced in accordance with the present invention should have a surface tension of about 30 to about 74 dynes per centimeter at an ink temperature of about 25° C, with the surface tension more preferably ranging from about 40 to about 60 dynes per centimeter. Most preferably, the ink should have a surface tension of about 50 to about 55 dynes per centimeter at an ink temperature of about 25° C. to enhance the compatibility and the uniform laydown of the inventive ink on any coating that is present on the recording media. Unless otherwise indicated, all surface tension values recited herein were determined with or are based upon use of the DuNOUY interfacial tensiometer that is available from CSC Scientific Company, Inc. of Fairfax, Va. using the surface tension measurement procedures set forth in the instructions accompanying the DuNOUY interfacial tensiometer. All surface tension values recited herein were determined at or are based upon an ink sample temperature of about 25° C.

When the ink of the present invention is prepared as a plurality of different inks for use as an ink set of an ink jet printer, the low viscosity of the individual inks of the ink sets aids in producing dots of about the same diameter for each ink of the ink set. Ordinarily, different interactions of the individual dots with the recording medium by virtue of the surface tension of the different inks, absent some type of off-setting influence, would cause individual dots formed from different inks to vary in height and to have somewhat different diameters. However, formulation of the inks to have a low viscosity offsets affects of the surface tension of the individual inks and permits individual dots of the different inks to flatten out on the recording medium in the desired circular shape. Additionally, the actual surface tension and viscosity are carefully balanced in each of the different inks of the ink set to give the printed dots of each of the different inks of the ink set about the same diameter, such as about 4 mils to about 5 mils, when printing via thermal ink jet printing on the recording medium.

Inks that are produced in accordance with the present invention have been found to be highly transparent. The dyes that are used in the ink of the present invention, as specified above, helps to enhance the transparency of the inventive inks. Additionally, since transparency is also a measure of impurities, such as salts within the ink, selection of the ink components based on a high transparency value helps minimize impurity levels in the ink. Minimization of impurities in the ink helps to optimize printer head performance by minimizing precipitation and plating of impurities on the printer head of the ink jet printer. Minimization of precipitable impurities also extends the life of the printer heads. The liquid conductivity of individual inks produced in accordance with present invention should preferably be about 10 milli-mhos, or less, to ensure that impurity levels are held at acceptably low levels. More preferably, the ink of the present invention should have a liquid conductivity of about 5 milli-mhos, or less, to further minimize impurity levels in the ink. Unless otherwise indicated, all liquid conductivity determinations recited herein were determined or are based upon use of a Model No. 01481-61 Conductivity Meter that is available from Cole-Parmer Instrument Co. of Vernon Hills, Ill. using the procedure set forth in the instructions accompanying the Model No. 01481-61 Conductivity Meter. All liquid conductivity values recited herein were determined at or are based upon an ink sample temperature of about 25° C.

Additionally, the ink produced in accordance with the present invention must be compatible with thermal ink jet printer components. Besides having a low level of impurities to enhance printer head operation and extend printer head life, the ink produced in accordance with the present invention preferably has a pH in the range of about 6.5 to about 8.5 to minimize the potential for corrosion of metallic materials that are sometimes used in printer head construction and that are subject to corrosion in acidic environments. Unless otherwise indicated, all pH determinations recited or specified herein are based upon use of the Oakton Model No. WD-35617-02 Digital Benchtop pH/mV/° C. Meter that is available from Cole-Parmer Instrument Co. of Vernon Hills, Illinois using the procedure set forth in the instructions accompanying the Model No. WD-35617-02 Digital Benchtop pH/mV/° C. Meter. All pH values recited herein were determined at or are based upon an ink sample temperature of about 25° C.

An additional consideration is that the dyes and other components used in the ink of the present invention should be thermally stable, and thus not subject to thermal decomposition, at temperatures ranging up to about 300° C., which is the maximum temperature typically experienced by inks in printer heads of thermal ink jet printers.

Inks that are prepared in accordance with the present invention are capable of drying very quickly, typically within less than about one minute, without any post treatment of the printed ink, such as application of hot air to the ink, and consequently permit high speed ink jet printing of multiple dot layers on the recording medium. If desired, hot air may be applied to the ink to further accelerate drying of the ink. However, such application of hot air is not essential to attaining quick ink drying rates.

The inks of the present invention are considered to be dry when the printed ink is free of tackiness and does not smear with application of finger pressure. Again, even without application of any post-treatment, such as application of hot air, the inks of the present invention typically meet this standard of dryness within less than about one minute after being printed on the recording medium.

One net effect of the process of preparing individual inks, including individual inks of an ink set, in accordance with the present invention is that each ink may have very similar performance characteristics within a relatively narrow range so that the jetability, the speed of ink jet printing, and the printed dot sizes and shapes of the different inks are essentially the same for each different ink. This is true, even though different dyes are used in making different inks and even though inks of the same color may have different dye concentrations, since the dye of each different ink produced in accordance with the present invention makes up only a small percentage of each of the different inks. Forcing the individual inks to have similar performance properties in this manner simplifies the process of ink jet printing, especially when using inks sets that contain multiple inks of the present invention, because this use of inks with similar performance characteristics between different inks negates any need to compensate for differences, other than color, between different inks.

The process of making the inks of the present invention is simple and straightforward, and does not require any complex, expensive processing equipment or procedures. First, all of the components of the ink, such as the water, water miscible organic solvent(s), dye, biocide, and any optional ingredients (surfactant, for example) are combined together in a mixing container. Thereafter, the combined components are blended together using any commercially available, low shear, mixing apparatus that does not promote foaming. One suitable low shear mixing technique merely entails slowly stirring the various ink components together to effect blending.

Next, air bubbles that may have been introduced during the mixing of the components can be removed from the ink by vacuuming the ink in accordance with standard and well known procedures for vacuuming inks. The vacuuming of the ink may be accompanied by use of any conventional ultrasonic vibration source in the ink to speed up the removal of trapped air bubbles. Next, after removal of any trapped air bubbles, the ink is preferably further treated by filtering through an appropriate filter media with a nominal pore size of 0.45 microns.

Examples 1–8 that are exhibited in Table I below demonstrate some preferred compositions of the ink produced in accordance with the present invention:

TABLE 1

| | Distilled Water (Wt. %) | Dipropylene Glycol (Wt. %) | Dipropylene Glycol Monomethyl Ether (Wt. %) | Proxel GXL (Wt. %) | Pigment Dispersion (Wt. %) |
|---|---|---|---|---|---|
| Yellow Ink (Example 1) | 62.4 | 7.5 | 5 | 0.1 | 25 |
| Dark Magenta Ink (Example 2) | 44.9 | 10 | 5 | 0.1 | 40 |
| Dark Cyan Ink (Example 3) | 44.9 | 10 | 5 | 0.1 | 40 |
| Black Ink (Example 4) | 37.4 | 7.5 | 5 | 0.1 | 50 |
| Orange Ink (Example 5) | 58.1 | 8.1 | 5 | 0.1 | 28.7 |
| Blue Ink (Example 6) | 44.9 | 10 | 5 | 0.1 | 40 |
| Medium Magenta Ink (Example 7) | 72.4 | 7.5 | 5 | 0.1 | 15 |
| Medium Cyan Ink (Example 8) | 72.4 | 7.5 | 5 | 0.1 | 15 |

All weight percentages provided in Table I are based on the total weight of the ink of the particular example.

EXAMPLE 1

The dye used was Direct Yellow 132 Dye that is available from Tricon Colors LLC. The ink composition was determined to have a viscosity of 1.84 cp, a surface tension of 51.9 dynes/cm, a specific gravity of 1.023, a conductivity of 2.37 millimhos, a pH of 8.3, and a transmittance of 63.4% at a wavelength of 420 nanometers and at a first dilution of 1.0% and a second dilution of 1.5%.

EXAMPLE 2

The dye used was Intrajet Liquid Magenta DJL that is available from Crompton & Knowles Colors Incorporated. The ink composition was determined to have a viscosity of 2.13 cp, a surface tension of 50.1 dynes/cm, a specific gravity of 1.033, a conductivity of 3.56 millimhos, a pH of 6.3, and a transmittance of 61.6% at a wavelength of 540 nanometers and at a first dilution of 1.0% and a second dilution of 1.5%.

EXAMPLE 3

The dye used was Duasyn Direct Turquoise Blue FRL-SF Liquid that is available from Clariant Corporation. The ink composition was determined to have a viscosity of 2.01 cp, a surface tension of 52.1 dynes/cm, a specific gravity of 1.035, a conductivity of 2.99 millimhos, a pH of 8.3, and a transmittance of 61.6% at a wavelength of 665 nanometers and at a first dilution of 1.0% and a second dilution of 1.0%.

EXAMPLE 4

The dye used was Duasyn Direct Black HEF-SF Liquid that is available from Clariant Corporation. The ink composition was determined to have a viscosity of 2.41 cp, a surface tension of 52.7 dynes/cm, a specific gravity of 1.033, a conductivity of 3.50 millimhos, a pH of 7.2, and a transmittance of 56.8% at a wavelength of 620 nanometers and at a first dilution of 1.0% and a second dilution of 1.0%.

EXAMPLE 5

The dyes used were Direct Yellow 132 Dye that is available from Tricon Colors LLC and Intrajet Liquid Magenta DJL that is available from Crompton & Knowles Colors Incorporated. The ink composition was determined to have a viscosity of 1.94 cp, a surface tension of 52.9 dynes/cm, a specific gravity of 1.025, a conductivity of 2.84 millimhos, a pH of 7.3, and a transmittance of 82.8% at a wavelength of 500 nanometers and at a first dilution of 1.0% and a second dilution of 2.0%.

EXAMPLE 6

The dyes used were Direct Yellow 132 Dye that is available from Tricon Colors LLC, Intrajet Liquid Magenta DJL that is available from Crompton & Knowles Colors Incorporated, and Duasyn Direct Turquoise Blue FRL-SF Liquid that is available from Clariant Corporation. The ink composition was determined to have a viscosity of 2.18 cp, a surface tension of 51.7 dynes/cm, a specific gravity of 1.034, a conductivity of 3.34 millimhos, a pH of 7.5, and a transmittance of 78.6% at a wavelength of 505 nanometers and at a first dilution of 1.0% and a second dilution of 1.5%.

EXAMPLE 7

The dye used was Intrajet Liquid Magenta DJL that is available from Crompton & Knowles Colors Incorporated. The ink composition was determined to have a viscosity of 1.73 cp, a surface tension of 51.8 dynes/cm, a specific gravity of 1.020, a conductivity of 1.71 millimhos, a pH of 7.0, and a transmittance of 61.0% at a wavelength of 540 nanometers and at a first dilution of 1.0% and a second dilution of 2.0%.

EXAMPLE 8

The dye used was Duasyn Direct Turquoise Blue FRL-SF Liquid that is available from Clariant Corporation. The ink composition was determined to have a viscosity of 1.63 cp, a surface tension of 53.4 dynes/cm, a specific gravity of 1.020, a conductivity of 1.57 millimhos, a pH of 7.8, and a transmittance of 72.4% at a wavelength of 665 nanometers and at a first dilution of 1.0% and a second dilution of 2.0%.

The present invention may have numerous other formulations, in accordance with details previously provided herein, in addition to those provided in Examples 1–8. For example, yellow ink may be made to contain from about 5 to about 30 weight percent of the yellow dye, magenta ink may be made to include from about 5 to about 45 weight percent of the magenta dye, cyan ink may be made to include from about 5 to about 45 weight percent of the cyan dye, and black ink may be made to include from about 5 to about 55 weight percent of the black dye. Furthermore, orange ink may be made to contain from about 5 to about 20 weight percent of the yellow dye and from about 5 to about 25 weight percent of the magenta dye, and blue ink may be made to contain from about 5 to about 30 weight percent of the yellow dye and from about 5 to about 30 weight percent of the cyan dye. Continuing with these additional examples, as the amount of dye is changed, the amount of distilled water may be changed by the same weight percentage in the opposite direction to that of the dye concentration change, while letting the concentrations (weight percentages) of the particular water-miscible organic solvent(s) (such as dipropylene glycol and dipropylene glycol monomethyl ether) remain the same, or approximately the same.

Inks of the present invention are preferably used in a thermal ink jet printer that is supplied by MacDermid ColorSpan Corporation, Inc. of Eden Prairie, Minn. One of the preferred ink jet printers that is available from ColorSpan Corporation, Inc. is the DISPLAYMAKER® Series XII large format ink jet printer. Those skilled in the art will readily understand that the ink and the ink sets produced in accordance with the present invention may be incorporated into other types of ink jet printers, besides the particular thermal ink jet printer mentioned above, such as other models of thermal ink jet printers, piezo ink jet printers, and plunger-types of ink jet printers.

The inks of the present invention may also be used in connection with the COLORMARK® on-head camera system that is available from MacDermid ColorSpan Corporation, Inc. of Eden Prairie, Minn. The COLORMARK® on-head camera system is described in detail in pending U.S. patent application Ser. No. 09/260,925 entitled "Method for Automatically Forming Ink and Media-Dependent Color Transforms For Diverse Colored Inks and Ink Types, Validating Color gamut, and Applying Said Inks", filed on Mar. 2, 1999.

All, details in this application Ser. No. 09/260,925 are hereby incorporated by reference. The COLORMARK® on-head camera system is used to create a table of L*, a*, and b* values that are obtained from a plurality of printed inks having different colors, map the L*, a*, and b* values of each pixel in a original image, and then, using the table of L*, a*, and b* values, transform the L*, a*, and b* values obtained from the original image into a set of inks that may be applied by process printing in a thermal ink jet printer to exactly replicate the original image. The inks of the present invention are particularly suited to use in the COLORMARK® on-head camera system due to the long term stability of the inventive inks and the ability of each discrete formulation of the inventive ink having a particular color to repeatedly reproduce the same color in a printed dot, no matter what substrate the particular formulation of the ink is printed on.

Besides incorporating the inventive ink into a variety of different types of ink jet printers, the ink of the present invention, some non-exhaustive examples of which are any of the inks of Examples 1–8, may be printed as high quality, uniform, circular-shaped dots on a wide variety of different recording mediums, some non-exhaustive examples of which are coated cloth, coated textiles, and coated fabrics.

Of course, to enhance the dimensional stability of the recording medium while being passed through the printing equipment, the recording medium may permissibly include any conventional temporary or permanent backing material on any side of the recording medium that is not being printed with the inventive ink, to prevent dimensional instability, such as stretching, of the recording medium during the printing process. Any such temporary backing material may be removed according to conventional practice at an appropriate time following printing of the inventive ink onto the recording medium.

The textile and the fabric that may serve as the recording medium for the dye-based ink of the present invention may be based on woven or knitted yarn, thread, or fiber that is (1) synthetic, (2) derived from animals, (3) derived from plants, or any combination of any of these. Some non-exhaustive examples of synthetic yarns or fibers include yarns or fibers made of or incorporating polymeric material, such as polyolefin (i.e. polyethylene, polypropylene, and polystyrene), polyester (such as polyethylene terephthalate and polybutylene terephthalate), spandex, acrylonitrile, polyamide, vinyl acetate, vinyl chloride, rayon, any copolymer of any of these, and any mixture of any of these. Some non-exhaustive examples of animal-derived yarns or fibers include yarns or fibers made of or incorporating silk, wool, cashmere, qiviut, mohair, animal hair, and any of these in any combination. Some exemplary sources of suitable animal hair include alpaca, angora, beaver, camel, fox, raccoon, and weasel. Some non-exhaustive examples of plant-derived yarns, threads, or fibers include yarns, thread, or fibers made of or incorporating abaca, linen, cotton, flax, ramie, hemp, jute, sisal, kenaf, sunn, urena, alginate, cellulose, and any of these in any combination.

The non-exhaustive list of recording mediums that is provided above for use with the ink of the present invention is described in terms of coated recording mediums, such as coated cloth, coated textiles, coated fabrics, etc. Unless otherwise indicated, all references to "coated," in connection with the exemplary recording media, refers to recording media that has been coated, prior to printing of the inventive ink, with (1) a substance that is designed to enhance one or more functional attributes of the recording media, such as, for example, abrasion resistance, durability, dimensional stability, colorfastness, etc. and/or (2) a substance that is designed to support absorption of the inventive ink into and/or adhesion of the inventive ink to the recording media.

The recording medium to which the inventive ink is applied includes a coating of a substance that is designed to support absorption of the inventive ink into the recording medium and/or adhesion of the inventive ink to the recording medium. After the inventive ink has been applied to the recording media, the textile industry typically incorporates a post-treatment step, such as application of steam or application of steam and air to the printed dye-based ink dots, to fix the printed dye-based inks dots to the aforementioned coated forms of recording media. As a last processing step, the printed recording media is rinsed in hot and cold water to remove any excess dye.

Also, it has been discovered that ink dots produced by thermal ink jet printing inks produced in accordance with the present invention may be overlapped with each other in any order without affecting the color that is visually observed when looking at the printed, layered ink dots. This ability to change the order of overlapping dots without changing the visually observed color applies to ink dots based on any colors of the inventive ink, other than ink based on black dye. This ability has also been found to exist even when two or more of the ink dots are based on inks having different concentrations of the same dye.

As an example, this ability has been observed with respect to the cyan inks, the magenta inks, and the yellow ink of Table 1, when the black ink of Table I is excluded from the stack of printed dots. No matter how dots of these Table I inks are stacked, the visually observed color of the stacked ink cots remains the same. For instance, when dots of the medium cyan ink of Table I are laid down on a sheet of white recording paper (not shown), dots of the dark magenta ink of Table I are laid down on the medium cyan ink, and dots of the yellow ink of Table I are then laid down on the dots of the cyan ink, using any particular thermal ink jet printer, it has been found that the color visually observed by looking at the image formed by the various dots layered on the white recording paper is virtually the same as the visually observed color of a different image where dots of the same yellow ink are first laid down on the white recording paper, dots of the same medium cyan ink are then laid down on the yellow ink dots, and dots of the dark magenta ink are then laid down on the medium cyan ink dots by the same thermal ink jet printer.

This ability to order the different colors of inks differently, while continuing to visually observe virtually the same color when viewing the different image, is believed to be due, at least in part, to both the high transparencies of the inks produced in accordance with the present invention and the thermal stability of the dyes used in forming the inks of the present invention. Stacking different colors of prior art inks in different orders on substrates by thermal ink jet printing causes the visually observed color of the resulting images to change somewhat, apparently because prior art inks are typically somewhat opaque.

Though ink sets produced in accordance with the present invention may be used to form a variety of different types of images such as half tone images where dots are stacked on top of individual dots in a pixel matrix, ink sets produced in accordance with the present invention have been found especially useful in forming stochastic images. When producing stochastic images, one or more base ink dots are first printed onto the substrate via ink jet printer. The base ink dots may all be the same color or different colors in any combination. In addition, any color(s) of ink used to form the base ink dots may have two or more different concentrations of the same dye. Each base ink dot may be positioned in any way relative to the other base ink dots of the image. For example, some of the base ink dots may overlap other base ink dots. As another example, any of the base ink dots may be spaced apart from other base ink dots within the printed image by any distance.

After the base ink dots are positioned on the substrate, one or more secondary ink dots may be printed onto the layer of the base ink dots in any pattern. The secondary ink dots may all be the same color or different colors in any combination. In addition, any color(s) of ink used to form secondary ink dots may have two or more different concentrations of the same dye. Each secondary ink dot may be positioned in any way relative to the base ink dots and other secondary ink dots of the image to obtain desired color combinations in the image. For example, any secondary ink dot may overlap other secondary ink dots and/or any of the base the ink dots. As another example, any of the secondary ink dots may be spaced apart from other secondary ink dots within the image by any distance.

Also, one or more different layers (such as a third layer, a fourth layer, etc.) of additional ink dots may be applied onto the secondary ink dots to further modify the printed image. Individual dots of the additional layer(s) may overlap with one or more of the secondary ink dots and/or any other dots, such as any of the base ink dots, that are present in the image to obtain desired color combinations in the printed image. All comments with respect to the secondary ink dots apply equally with respect to any additional ink dots applied to the image. An important aspect of the image produced in this fashion is that the image fully covers the recording medium or substrate so that the recording medium or substrate is not directly visible through the image. This is different from half tone image printed with ink jet printers where the substrate is visible following image application to the recording medium or substrate.

Ink sets may be produced by pre-selecting inks of the present invention that, when printed in a predetermined fashion by computer control, match each of the individual ink colors of commercially available color standards, such as the PANTONE MATCHING SYSTEM® color matching system that is available from Pantone, Inc. of Carlstadt, N.J. The PANTONE MATCHING SYSTEM® color matching system is based upon a total of fourteen different standard colors of pigmented inks. These fourteen different standard color of ink are currently known as (1) PANTONE® yellow ink, (2) PANTONE® yellow 012 ink, (3) PANTONE® orange 021 ink, (4) PANTONE® warm red ink, (5) PANTONE® red 32 ink, (6) PANTONE® rubine red ink, (7) PANTONE® rhodamine red ink, (8) PANTONE® purple ink, (9) PANTONE® violet ink, (10) PANTONE® blue 072 ink, (11) PANTONE® reflex blue ink, (12) PANTONE® process blue ink, (13) PANTONE) green ink, and (14) PANTONE® black ink.

The PANTONE MATCHING SYSTEM® color matching system is one of the most popular color matching systems in the printing industry, especially in the U.S. The color gamut of the PANTONE MATCHING SYSTEM® color matching system is based upon spot coloring which entails mixing combinations of different colored inks to form a single ink of a particular color that is thereafter applied to a recording medium to characterized one discrete color of the color gamut. Spot coloring of additional single color inks based upon different combinations of different colored ink proceeds to fill out and define the color gamut of the PANTONE MATCHING SYSTEM® color matching system.

Ink sets may be produced in accordance with the present invention that will collectively permit reproduction of any color image, no matter how the image was originally created. This ability derives from the wide color gamut that ink sets produced in accordance with the present invention are capable of attaining when used in ink jet printing. Ink sets selected in accordance with the present invention may include any combination of any number of different inks of the present invention, limited only by the number of inks the ink jet printer of choice is able to accommodate. The different inks may include any combination of different colored inks and any number of inks with different concentrations of the same dye.

For example, an ink set could be selected in accordance with the present invention to have an ink (1) with one dye (a) at a single concentration of the dye (a), an ink (2) with one dye (b) at a single concentration of the dye (b), inks (3–5) in three different concentrations of dye (c), and inks (6–8) in three different concentrations of dye (d). As another example, a different ink set selected in accordance with the present invention may include inks (1–8) at a single concentration of dyes (a–h), respectively, only. As yet another example, an ink set selected in accordance with the present invention may include inks (1–2) in two different concentrations of dye (a), inks (3–4) in two different concentrations of dye (b), and inks (5–8) in four different concentrations of dye (c). As still another example, an ink set selected in accordance with the present invention may include inks (1–2) in two different concentrations of dye (b), and inks (3–4) in two different concentrations of dye (b), and inks (5–6) in two different concentrations of dye (c).

Any ink set that incorporates inks of the present invention may be based on a set of prepared inks in different colors, such as the primary cyan, magenta, and yellow colors and black. Also, any ink set that incorporates inks of the present invention may include inks that are prepared by mixing different proportions of pre-prepared primary color inks, such as in accordance with color combination formulas or guides of a color matching system (the PANTONE MATCHING SYSTEM® color matching system, for example) to achieve any color exhibited in the color matching system. Such mixing of pre-prepared primary color inks that are prepared in accordance with the present invention is simple and trouble-free due to the high dye dispersion stability of the inventive inks and due to the ability to simply combine and mix different inks of the present invention in any combination without employing any complex or expensive mixing equipment or procedures and without having to worry about any sedimentation, separation of the dyes in the completed mixture of different inks.

This mixing of pre-prepared primary color inks results in formation of inks that may be included in an ink set and applied as spot colors to achieve colors in a printed image unattainable by process printing of process color inks also present in the ink set. Thus, the ink of the present invention provide an avenue for hybridizing the spot color and process color printing techniques. This provides printers with a technique of achieving unique color gamuts, using an ink set with a particular number of inks, that would not be achievable when relying on only process printing of the inks in the ink set.

Different combinations (sets) of inks of the present invention may be created for purposes of attaining different goals. For example, one particular combination of interest, that is nicknamed the "Color System" combination, includes twelve inks as three sets of four different colors. In the Color System combination, the first set includes a dark cyan ink with the formulation used in Example 3, a dark magenta ink with the formulation used in Example 2, a yellow ink with the formulation used in Example 1, and a black ink with the formulation used in Example 4. The second and third sets of the Color System combination are identical to the first set of the Color System combination. Thus, the Color System combination includes three replicates of the same dark cyan ink, three replicates of the same dark magenta ink, three replicates of the same yellow ink, and three replicates of the same black ink, for a total of twelve inks representing four different colors.

The Color System combination of inks exhibits outstanding performance when printed using the DISPLAYMAKER® Series XII large format ink jet printer that is available from MacDermid ColorSpan Corporation, Inc. of Eden Prairie, Minn. One benefit of the Color System combination is provision of a large volume of high quality dye-based inks capable of supporting longer four color process printing runs. Another benefit of the Color System combination, that is believed to derive from the highly transparent inks incorporated in the Color System combination, is the wide color gamut attainable by the Color System combination. Yet another benefit of the Color System combination is the repeatability in visual observed color of printed images of the Color System inks, no matter whether the Color System inks are printed on different substrates, are printed at widely varying times, and/or originate as different batches of the same ink, for a particular color ink of the Color System Combination.

Another particular combination (or set) of interest, that is nicknamed the "Gamut+ Mode Hi-Fi" combination, includes twelve inks as two sets of four different colors and two additional sets of two more colors. In the Gamut+ Mode Hi-Fi combination, a first set includes a dark cyan ink with the formulation used in Example 3, a dark magenta ink with the formulation used in Example 2, a yellow ink with the formulation used in Example 1, and a black ink with the formulation used in Example 4. A second set of the Gamut+ Mode Hi-Fi combination is identical to the first set of the Gamut+ Mode Hi-Fi combination. A third set of the Gamut+ Mode Hi-Fi combination includes an orange ink with the formulation used in Example 5 and a green ink that is based upon a green dye. The green ink is prepared in accordance with the present invention to match any desired green color standard or sample. A fourth set of the Gamut+ Mode Hi-Fi combination is identical to the third set of the Gamut+ Mode Hi-Fi combination. Thus, the Gamut– Mode Hi-Fi combination includes two replicates of the same dark cyan ink, two replicates of the same dark magenta ink, two replicates of the same yellow ink, two replicates of the same black ink, two replicates of the same orange ink, and two replicates of the same green ink for a total of twelve inks representing six different colors.

The Gamut+ Mode Hi-Fi combination of inks exhibits outstanding performance when printed using the DISPLAYMAKER® Series XII large format ink jet printer that is available from MacDermid ColorSpan Corporation, Inc. One benefit of the Gamut+ Mode Hi-Fi combination is provision of a large volume of high quality pigmented inks capable of supporting longer six color process printing runs. Another benefit of the Gamut+ Mode Hi-Fi combination, that is believed to derive from the highly transparent inks incorporated in the Gamut+ Mode Hi-Fi combination, is the wide color gamut attainable by the Gamut+ Mode Hi-Fi combination. Yet another benefit of the Gamut+ Mode Hi-Fi combination is the repeatability in visual observed color of printed images of the Gamut+ Mode Hi-Fi inks, no matter whether the Gamut+ Mode Hi-Fi inks are printed on different substrates, are printed at widely varying times, and/or originate as different batches of the same ink, for a particular color ink of the Gamut+ Mode Hi-Fi combination.

Another particular combination (or set) of interest, that is nicknamed the "Gamut+ Mode R & B" combination, includes twelve inks as two sets of four different colors and two additional sets of two more colors. In the Gamut+ Mode R & B combination, a first set includes a dark cyan ink with the formulation used in Example 3, a dark magenta ink with the formulation used in Example 2, a yellow ink with the formulation used in Example 1, and a black ink with the formulation used in Example 4. A second set of the Gamut+ Mode R & B combination is identical to the first set of the Gamut+ Mode R & B combination. A third set of the Gamut+ Mode R & B combination includes a red ink that is based upon a red dye and a blue ink with the formulation used in Example 6. The red ink is prepared in accordance with the present invention to match any desired red standard or sample. A fourth set of the Gamut+ Mode R & B combination is identical to the third set of the Gamut+ Mode R & B combination. Thus, the Gamut+ Mode R & B combination includes two replicates of the same dark cyan ink, two replicates of the same dark magenta ink, two replicates of the same yellow ink, two replicates of the same black ink, two replicates of the same red ink, and two replicates of the same blue ink for a total of twelve inks representing six different colors.

The Gamut+ Mode R & B combination of inks exhibits outstanding performance when printed using the DISPLAYMAKER® Series XII large format ink jet printer that is available from MacDermid ColorSpan Corporation, Inc. One benefit of the Gamut+ Mode R & B combination is provision of a large volume of high quality pigmented inks capable of supporting longer six color process printing runs. Another benefit of the Gamut+ Mode R & B combination, that is believed to derive from the highly transparent inks incorporated in the Gamut+ Mode R & B combination, is the wide color gamut attainable by the Gamut+ Mode R & B combination. Yet another benefit of the Gamut+ Mode R & B combination is the repeatability in visual observed color of printed images of the Gamut+ Mode R & B inks, no matter whether the Gamut+ Mode R & B inks are printed on different substrates, are printed at widely varying times, and/or originate as different batches of the same ink, for a particular color ink of the Gamut+ Mode R & B combination.

Yet another particular combination (or set) of interest, that is nicknamed the "Hi-Res" combination, includes twelve inks as two sets of four different colors and two additional sets of two more colors. In the Hi-Res combination, a first set includes a dark cyan ink with the formulation used in Example 3, a dark magenta ink with the formulation used in Example 2, a yellow ink with the formulation used in Example 1, and a black ink with the formulation used in Example 4. A second set of the Hi-Res combination is identical to the first set of the Hi-Res combination. A third set of the Hi-Res combination includes a medium cyan ink with the formulation used in Example 8 and a medium magenta ink with the formulation used in Example 7. A fourth set of the Hi-Res combination is identical to the third set of the Hi-Res combination. Thus, the Hi-Res combination includes two replicates of the same dark cyan ink, two replicates of the same dark magenta ink, two replicates of the same yellow ink, two replicates of the same black ink, two replicates of the same medium cyan ink, and two replicates of the same medium magenta ink for a total of twelve inks representing four different colors with two of the different colored inks being present at two different concentrations of pigment.

The Hi-Res combination of inks exhibits outstanding performance when printed using the DISPLAYMAKER® Series XII large format ink jet printer. that is available from MacDermid ColorSpan Corporation, Inc. One benefit of the Hi-Res combination is provision of a large volume of high quality pigmented inks capable of supporting longer six color process printing runs. Another benefit of the Hi-Res combination, that is believed to derive from the highly transparent inks incorporated in the Hi-Res combination, is the wide color gamut attainable by the Hi-Res combination. Yet another benefit of the Hi-Res combination is the repeatability in visual observed color of printed images of the Hi-Res inks, no matter whether the Hi-Res inks are printed on different substrates, are printed at widely varying times, and/or originate as different batches of the same ink, for a particular color ink of the Hi-Res combination.

The dye-based inks of the present invention may be combined in various combinations to create additional sets of dye-based inks that will be capable of attaining a particular gamut of color that is capable of satisfying the printing requirements for a particular printing job.

The reason why inks are included in some of the ink combinations, or sets, of the present invention in different concentrations of the same dye concerns the resolution power of the human eye for particular colors. As is well known, the resolution power of the human eye varies, sometimes substantially, between different colors. When the resolution of the eye for a particular color is relatively high, a dot of that color is more easily recognized by the eye. Colors with high resolution which are readily recognized by the eye are preferably present in ink sets of the present invention in a plurality of different concentrations of the same dye. Otherwise, lighter tones inks of the same color would be unattainable and expansion of the color gamut attainable using different concentrations of the inks of a particular ink set would be unnecessarily limited. The lower dye concentration, lighter tone versions of the inks having high resolution colors permit expansion of the gamut of different colors attainable by the particular ink set that could not be reached if the ink having high resolution color were included in the ink set at only a single dye concentration.

As an example, in one of the ink sets of the present invention, where the ink set includes cyan ink, magenta ink, yellow ink, and black ink, the cyan ink and the magenta ink are each preferably present in a plurality of different dye concentrations, whereas the yellow ink and the black ink are optionally present only in a single pigment concentration. The reason for this is that the resolution power of the human eye is quite high for cyan ink and magenta ink. On the other hand, the resolution power of the human eye is quite low for yellow ink, even at relatively high concentrations of yellow dye in the yellow ink. Accordingly, a light tone of yellow ink inherently exists even though the yellow ink is present in only a single concentration of yellow dye.

The resolution of the human eye is high for black inks. However, only one black ink with a single concentration of black dye is needed because light tones of black ink may be reproduced by a combination of cyan, magenta, and yellow ink dots. A black ink with a relatively high concentration of black dye is included in the ink set, despite the fact that a combination of cyan, magenta, and yellow ink dots reproduces a light tone of black ink, because combination of magenta ink dots and cyan ink dots containing relatively high concentrations of dye, together with yellow ink dots, does not accurately reproduce the true black color that is attainable when using a high concentration of black dye in a black ink.

When it is desired to use a plurality of different concentrations of a single dye in forming different inks of the same color, such as magenta or cyan inks, selection of the number of different dye concentrations to use requires balancing of competing factors. When only two inks with different concentrations of the same dye are used, images printed with the ink set incorporating the two inks with different concentrations of the same dye require less ink and therefore dry somewhat faster. However, use of only two inks with different concentrations of the same dye does limit the ability of combinations of the different inks of the ink set to stretch the gamut of colors attainable by the ink set.

On the other hand, when the plurality of inks with different concentrations of the same dye includes four or more inks with differing concentrations of the same dye, the inks included in the ink set are able to substantially expand the gamut of colors attainable by combinations of the different inks of the ink set. However, use of a single color ink in four different concentrations of the same dye causes more ink to be required in forming the image and thereby causes a substantial increase in the amount of time required for the image to dry. Additionally, use of four inks with different concentrations of the same dye in ink jet printers is believed to unnecessarily complicate the structure and operation of the ink jet printers. This is because it has been found that use of three inks with different concentrations of the same dye captures a substantial amount of the increase in color gamut that occurs when moving from two inks with different concentrations of the same dye to four inks with different concentrations of the same dye. Additionally, selection of three inks with different concentrations of the same dye, decreases the amount of ink placed on the image, consequently reducing the amount of time required for the image to dry, and also helps in controlling the structural and operational complexity of the ink jet printer that relies on the ink set to produce the image.

Although the present invention has been described with reference to preferred embodiments, workers skilled in the art will recognize that changes may be made in form and detail without departing from the spirit and scope of the invention.

What is claimed is:

1. A method of applying a series of dye-based ink jet inks in different colors to a recording medium, comprising the steps of:
   a) formulating each of the dye-based ink jet inks by combining water, water-miscible organic solvent, and dye
   b) printing said dye-based ink jet ink as a series of ink dots on said recording medium as a first layer of said ink dots;
   c) fixing the printed dye-based ink dots to said recording medium; and
   d) rinsing said printed recording medium to remove any excess dye;
   wherein said recording medium is selected from the group consisting of coated cloth, coated textiles, and coated fabric and said coating enhances one or more functional attributes of the recording medium.

2. The method of claim 1, wherein said printing of said dye-based ink jet ink is accomplished using an ink jet printer or an on-head camera system.

3. The method of claim 2, wherein said ink jet printer is selected from the group consisting of a thermal ink jet printer, a piezo ink jet printer, and a plunger ink jet printer.

4. The method of claim 1, wherein said coating supports absorption of the dye-based ink jet ink into the recording medium or supports adhesion of the dye-based ink jet ink to the recording medium.

5. The method of claim 1, wherein said recording medium includes a temporary or permanent backing material on a side of the recording medium that is not being printed with said dye-based ink jet ink.

6. The method of claim 5, wherein said temporary backing material is removed following printing of said dye-based ink jet ink on said recording medium.

7. The method of claim 1, wherein said recording medium comprises woven or knitted yarn, thread or fibers derived from animals, derived from plants, and combinations thereof.

8. The method of claim 1, wherein said ink dots are circular dots that are substantially free of ragged edges.

9. The method of claim 1, wherein said different colors comprise primary color inks.

10. The method of claim 9, wherein said primary color inks are selected from the group consisting of cyan, magenta, yellow and black.

11. The method of claim 9, wherein said ink set includes inks that are prepared by mixing different proportions of said primary color inks.

12. The method of claim 1, wherein said series of inks in different colors are formulated by changing a concentration of the dye in said dye-based ink jet ink.

13. The method of claim 12, wherein as a concentration of the dye in said dye-based ink jet ink is changed, a concentration of water is changed by the same weight percent in an opposite direction to that of the dye concentration change while a concentration of the water miscible solvent remains the same or approximately the same.

14. The method of claim 12, wherein said ink sets includes a combination of different colored inks and inks with different concentrations of the same dye.

15. The method of claim 14, wherein surface tension and viscosity are balanced in each of the different inks of the ink set to give the printed dots of each of the different inks of the ink set about the same diameter.

16. The method of claim 15, wherein the diameter of the ink dots is from about 4 mils to about 5 mils.

17. The method of claim 1, wherein said printed dye based ink jet inks dots are printed onto the recording medium in a predetermined fashion.

18. The method of claim 17, wherein the dots have about the same diameter for each ink of the ink set.

19. The method of claim 17, wherein one or more secondary layers of ink dots are printed onto the first layer of ink dots.

20. The method of claim 19, wherein said one or more secondary layers of ink dots are the same color as the first layer of ink dots, a different color from the first layer of ink dots, or any combination thereof.

21. The method of claim 1, wherein the dye-based ink dots, except for black dye-based ink dots, are overlapped with each other in any order and said order does not change the visually observed color.

22. The method of claim 1, wherein the water-miscible organic solvent is selected from the group consisting of ethers, oxyethylene or oxypropylene addition dimers, trimers or polymers, alkylene glycols having an alkylene group of 2 to 6 carbons, thiodiglycol, glycerin, lower alkyl ethers of a polyhydric alcohol, lower dialkyl ethers of a polyhydric alcohol, sulfolane, 1,3-dimethyl-2-imidazolidinone, and combinations thereof.

23. The method of claim 1, wherein the water-miscible organic solvent includes a high-boiling, water miscible organic solvent selected from the group consisting of oxyethylene or oxypropylene addition dimers, trimers, or polymers, lower alkyl ethers of a polyhydric alcohol, or any combination thereof.

24. The method of claim 1, wherein the concentration of the water-miscible organic solvent in the ink ranges from about 2% to about 30%, by weight, based on the total weight of the ink.

25. The method of claim 24, wherein the concentration of the water-miscible organic solvent in the ink ranges from about 5% to about 20%, by weight, based on the total weight of the ink.

26. The method of claim 25, wherein the concentration of the water-miscible organic solvent in the ink ranges from about 10% to about 15%, by weight, based on the total weight of the ink.

27. The method of claim 1, wherein the concentration of the water in the ink ranges from about 5% to about 95%, by weight, based on the total weight of the ink.

28. The method of claim 27, wherein the concentration of the water in the ink ranges from about 35% to about 90%, by weight, based on the total weight of the ink.

29. The method of claim 28, wherein the concentration of the water in the ink ranges from about 70% to about 90%, by weight, based on the total weight of the ink.

30. The method of claim 1, wherein the concentration of the dye in the ink ranges from about 0.1% to about 55%, by weight, based on the total weight of the ink.

31. The method of claim 1 wherein said printed dye-based ink dots are fixed to the recording medium by applying steam or steam and air.

32. The method of claim 1, wherein each of the formulated dye-based ink jet inks is subsequently vacuumed and filtered.

* * * * *